United States Patent [19]

Kato

[11] 4,393,560
[45] Jul. 19, 1983

[54] CLIP FOR RETAINING A WINDSHIELD MOLDING IN AN AUTOMOBILE

[75] Inventor: Yoshinori Kato, Aichi, Japan

[73] Assignee: Kabushiki Kaisha Togo Seisakusho, Japan

[21] Appl. No.: 272,225

[22] Filed: Jun. 10, 1981

[30] Foreign Application Priority Data

Jun. 28, 1980 [JP] Japan .............................. 55-91203[U]
Apr. 15, 1981 [JP] Japan .............................. 56-54910[U]

[51] Int. Cl.³ .............................. B60J 1/00; E06B 3/58
[52] U.S. Cl. ....................................... 24/295; 24/297; 52/718; 296/84 R; 296/84 A
[58] Field of Search .................. 24/289, 291, 292, 293, 24/294, 295, 296, 297, 326, 335, 336, 338, 343, 346, 369, 370, 371; 52/716, 717, 718, 400; 296/84 R, 84 A, 84 D, 93

[56] References Cited

U.S. PATENT DOCUMENTS

| 4,135,277 | 1/1979 | Taniai et al. | 24/297 |
| 4,143,906 | 3/1979 | Plourde | 296/84 D |
| 4,168,858 | 9/1979 | Inamoto | 296/84 A |
| 4,170,855 | 10/1979 | Murray et al. | 52/717 |

FOREIGN PATENT DOCUMENTS 2450371 10/1980 France .............................. 296/84 R Primary Examiner—Gene Mancene
Assistant Examiner—David L. Tarnoff
Attorney, Agent, or Firm—John E. Benoit

[57] ABSTRACT

A clip for retaining molding to a predetermined inside face of a window glass receiving frame in an automotive body having a band-like support plate formed of an elastic material. The support plate includes a hook member formed integrally with the support plate to thereby define a spacing for insertion of the molding between the window glass receiving frame and the hook member and elastically engageable with the molding and a pair of wing plates formed at both outermost ends of the support plate and bent in a direction opposite to the retaining face of the support plate. The wing plates have a mechanism engageable with the support plate while the wing plates are bent substantially to 180° and another mechanism effective to disengage the wing plates with the support plate, upon insertion of the molding in the spacing between the frame and the hook member of the clip.

10 Claims, 21 Drawing Figures

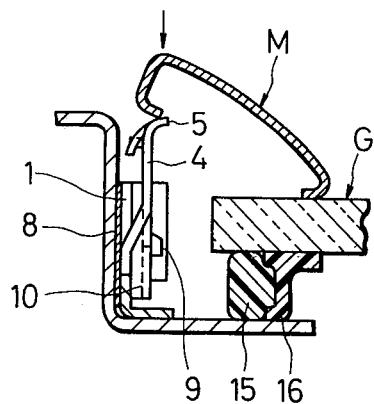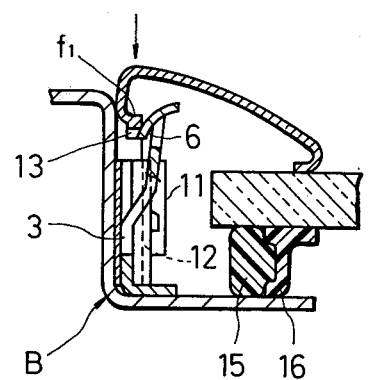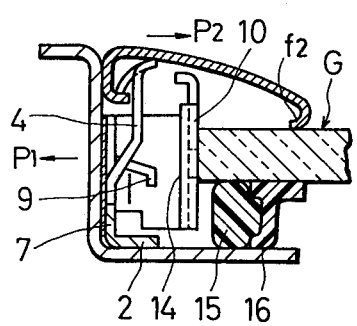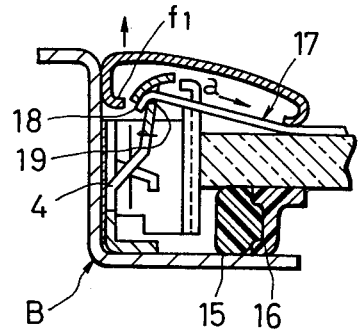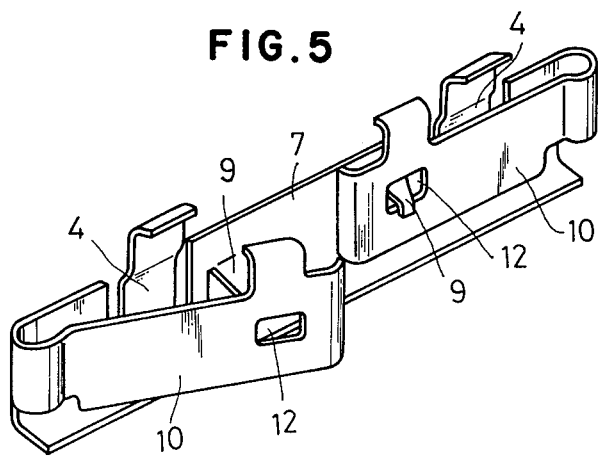

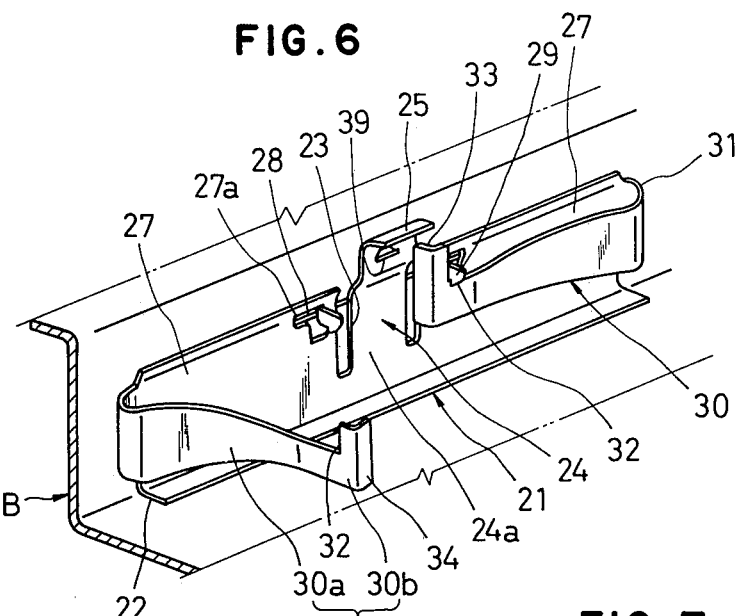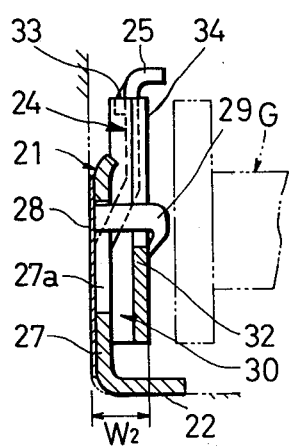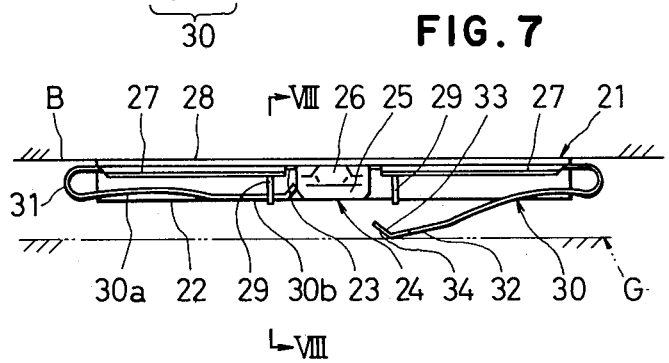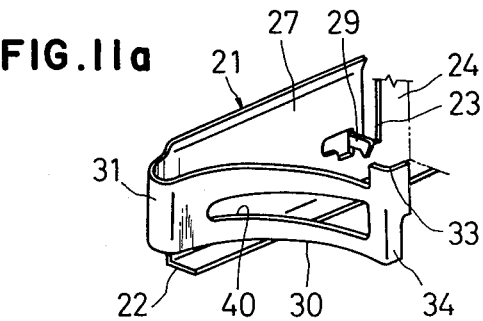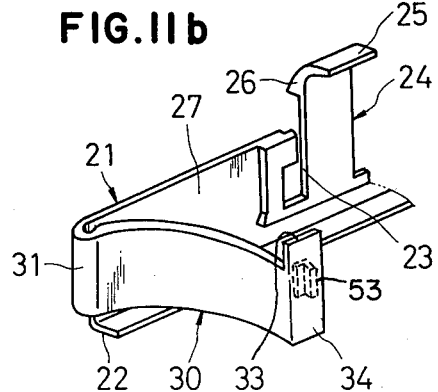

CLIP FOR RETAINING A WINDSHIELD MOLDING IN AN AUTOMOBILE

BACKGROUND OF THE INVENTION

1. Field of the Invention

This invention relates to a clip for retaining a molding to be installed around a front or rear window glass of automobiles.

2. Description of the Prior Art

It has been commonly accepted practice to employ, for a retaining means often referred to as a molding clip, a bonding means such as a double-faced adhesive tape to bond the clip to the inner surface of the window frame of a vehicle body. It is important to note that in this type of clip, adequate technical steps are not taken for the clip itself to be securely bonded in due consideration of a reaction force created during molding installation, in other words, a force acting in a direction which tends to strip the clip from the body frame; and in consideration of the spacing between the inner peripheral face of the window frame and the peripheral edge of the window glass to be installed in the frame. Thus, in the event that variations in the above-mentioned spacing are particularly present, a force thrusting the clip to the window may not be effectively exerted.

For this reason, therefore, there have been problems with this type of clip that the bonding force will be attenuated by an offsetting force at molding installation. As a result, there is a tendency for such a clip to be simply temporarily secured by the double-faced tape, causing at times insufficient bonding condition and making it practically difficult to hold the molding securely for an extended period of time, even though the molding has been fixed on a hook portion of the clip.

SUMMARY OF THE INVENTION

The present invention provides a novel and simple solution to many of the problems described in the preceeding paragraphs. According to the primary teaching of the present invention, the clip is provided with a support adapted to be bonded to the frame of an automotive body. The support plate includes a hook member for holding a molding thereon, and a pair of elastically deformable wing plates formed at both outermost ends of the support plate and extending generally inwardly of the clip. The molding is resiliently urged toward and engaged with the hook member, while the wing plate is operatively spread from the closed position so as to abut on the glass edge under pressure. The spring force of the wing plates is so designed to be larger than that of the hook member. Thus, thrusting force of the wing plates against the frame is greater than the force developed at the hook member which tends to strip the clip from the frame and effectively hold the clip securely to the frame.

Accordingly, the clip of the present invention may exert a suitable and yet effective thrusting force at all times within the range from closed position to opened position of the wing plates even though variations in spacing is apparent between the frame inside and the window glass. It will be appreciated that the clip may be firmly held and secured to the frame through a combined force of the bonding force and the thrusting force in spite of the reaction force developed during molding installation. Additionally, applicability of the clip is enhanced because of the elasticity of wing plates which are formed integrally with the support plate.

According to an alternative embodiment of the present invention, the wing plate is so designed as to form an inwardly curved configuration along its length toward the support plate and have gradually reduced section modulus toward its free end. In this manner, when in closed position, the wing plates may be always held within possible least spacing, thereby making it possible to form a generally thin clip in overall configuration.

It is therefore a primary object of the present invention to provide a clip which is capable of retaining a molding in a stable condition for a long period of time.

It is another object of the present invention to provide a clip which is simple in construction and easy to handle.

It is a further object of the present invention to provide a clip which will not interfere with the window glass even if the spacing between the glass and the frame is small and unequal.

It is a still further object of the present invention to provide a clip which may be firmly secured to the frame of a vehicle body.

BRIEF DESCRIPTION OF THE DRAWINGS

FIGS. 4(a), 4(b), 4(c) and 4(d) are illustrative views showing use of the clip in sequence;

FIG. 5 is a perspective view of a modification of the clip according to the first embodiment;

FIG. 6 is a perspective view of a clip according to the second embodiment of the present invention;

FIG. 7 is a plan view thereof;

FIG. 8 is a sectional view taken along line VIII—VIII of FIG. 7;

FIGS. 11(a) and 11(b) are perspective views of modifications of the wing plate.

DETAILED DESCRIPTION OF THE PREFERRED EMBODIMENTS

Figure 1:
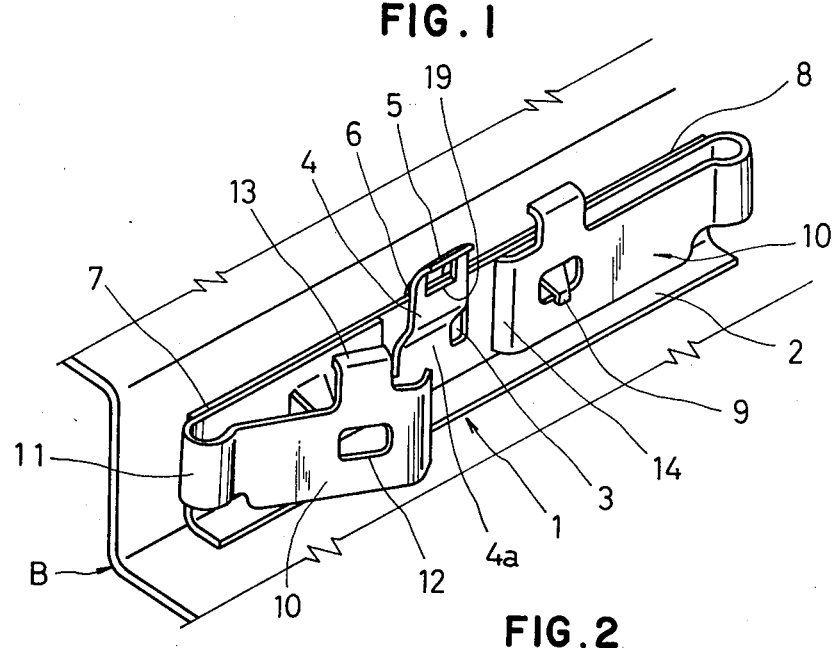
FIG. 1 is a perspective view of a clip according to the first embodiment of the present invention.
Figure 2:
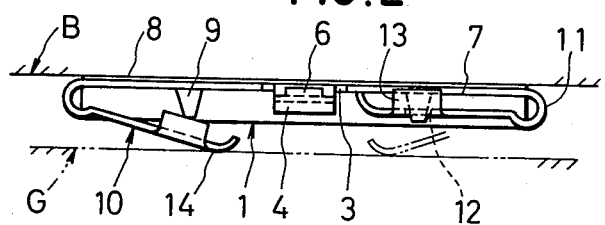
FIG. 2 is a plan view thereof.

Referring now to FIGS. 1 through 4, there is shown a clip according to the first embodiment of the present invention. The clip is formed by pressing a thin resilient metal plate. Reference numeral 1 is a clip having at the lower end thereof a bottom seat 2 attachable to the bottom face of a glass receiving frame B of a vehicle body. The clip includes a support plate 7 which also includes a hook member 4 disposed generally at the central portion of the plate 7 with a pair of U-shaped slits 3 interposed therebetween and a pair of wing plates 10 foldingly formed at the outermost ends thereof and adapted for elastic deformation.

The hook member 4 is formed in a step-like manner from the base portion 4a toward the upper portion thereof. It is provided with a flange portion 5 for receiving a flange portion $f_1$ of a molding M; and with a pawl 6 punched out generally below the flange portion 5 and extending outwardly to form a curved guide face along with the flange portion 5 for elastic engagement with the flange portion $f_1$ of the molding M.

The support plate 7 further includes a double-faced adhesive tape 8, one face of which being stuck to the outside face of the plate 7 and the other being bonded to the inside surface of the frame B; and a pair of pawl members 9 punched out generally at the central portion away from the hook member 4 and extending inwardly, that is, toward the wing plates 10. For reference purposes, the tape 8 is referred to as a sheet having equal length as that of the clip 1.

Each of the wing plates 10 is integrally formed with the support plate 7 at the outermost end thereof in a cantilever-shaped manner through a generally U-shaped connection portion 11. The wing plate 10 includes at about the free end portion thereof a hooking aperture 12 engageable with the pawl member 9, an abutment member 13 engageable with the flange portion $f_1$ of the molding M and an abutment edge 14 engageable with the end face of a window glass G. Such a wing plate 10 is normally in a narrow closed position relative to the opposed wing plate 10 at a suitable distance through engagement of the pawl member 9 with the aperture 12. Upon insertion of a molding M, the wing plate 10 is then brought to an opened position extending freely toward the glass G upon disengagement of the pawl member 9 with the aperture 12. As should be appreciated in FIG. 3, the respective spacings $W_1$ and $W_2$ of the wing plate 10 in its closed and opened positions relative to the support plate 7 are established so as to be $W_1 > W > W_2$, where W is a spacing between the body frame B and the window glass G. Thus, available thrusting force may be produced through the elastic deformation of the wing plate 10 within the range. The spring force of the wing plate 10 is so designed to be at least equal to that of the hook member 4.

Figure 3A:
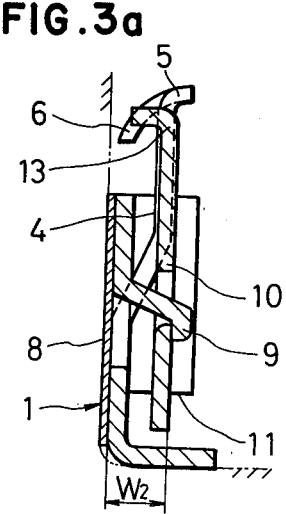
FIGS. 3(a) and 3(b) are sectional views of the clip illustrating an engaged and disengaged positions of the support plate with the wing plates for purposes of comparison.
Figure 3B:
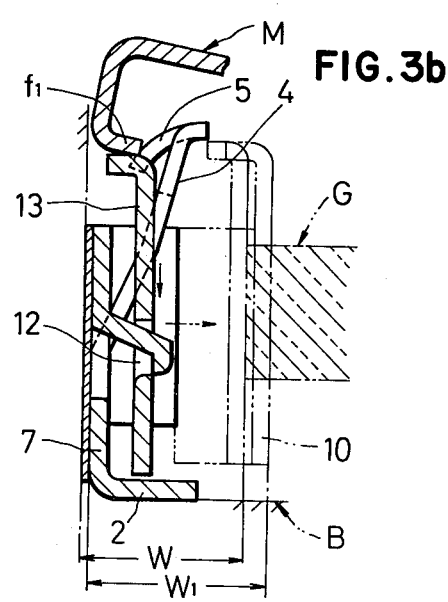

It should be noted that the flange portion 5 of the hook member 4 is disposed suitably at a higher position relative to the abutment members 13 of each wing plate 10, and the pawl 6, suitably at a lower position relative to the abutment members 13, as clearly seen in FIG. 3. It should be also appreciated that engagement and disengagement of the pawl member 9 with the aperture 12 may be readily achieved by utilizing a vertical elastic deformation of the wing plate 10 through the connection portion 11. The face portions of pawl member 9 and aperture 12 may be provided with a suitable guide face of curved or sloping configuration. The window glass G is installed in the body frame B through the use of an adhesive sealing member 15 and a dam 16 according to the conventional techniques, as shown in FIG. 4.

The clip constructed as described in the preceeding paragraphs, may be readily put in practical use, as shown in FIG. 4, in conjunction with the procedures of installing clip 1 to the vehicle body and inserting molding M therebetween.

In operation, with the wing plate 10 held in a closed position, the bottom seat 2 of the clip 1 is placed on the body frame B and the support plate 7 of the clip 1 is bonded to a predetermined position on the inner surface of the frame B by using the double-faced adhesive tape 8, as may be seen in FIG. 4(a). When secured in this manner, the spacing between the frame B and the pawl 6 of the hook member 4 is suitably smaller than the width of the flange portion $f_1$ of the molding M. Then, flange portions $f_1$ and $f_2$ of the molding M are respectively placed on the hook member 4 and the abutment members 13 of both wing plates 10 and on the window glass G secured to the frame B. It is then forced in by a finger tip in a direction of arrow, as clearly seen in FIG. 4(a).

During the process, the molding M is locked in place through its engagement with the pawl 6 as the flange portion $f_1$ of the molding M is being guided by the flange portion 5 aided by inwardly (rightward of FIG. 3) elastic deformation of the hook member 4. As clearly seen in FIG. 4(b), the flange portion $f_1$ of the molding M abuts on both abutment members 13 of the wing plates 10 and resiliently presses down the free end portion thereof until it is locked to the pawl 6 of the hook member 4. As the result, the pawl members 9 disengage with the apertures 12 and the wing plates 10 will be wide spread by its own elasticity. At this moment, the abutment edges 14 abut on the edge face of the glass G, as may be clearly seen in FIGS. 2 and 4(c).

The molding M will be thus held in a proper position, that is, as most clearly seen in FIG. 4(c), under the force due to the deformation of the hook member 4, the outside portion of flange $f_1$ is pressed to the frame B and the inside portion of flange $f_2$ contacts tightly with the upper surface of the glass G.

On the other hand, the clip 1 is pushed on the inner surface of the frame B because the thrusting force $P_1$ due to the elastic deformation of both wing plates 10 is greater than stripping force $P_2$ developed at the hook member 4 at the time of insertion of the molding M into the space between the frame B and the hook member 4 and tending to strip the clip 1 from the frame B.

It will be appreciated from FIG. 4(c) that the molding M may be properly placed in alignment with the vehicle body with the flange portion 5 of the hook member 4 applied to the inner surface of the molding M and through cooperation of the pawl 6, thereby precluding any possible slack or looseness of molding M in a vertical direction.

Furthermore, since the wing plate 10, integrally formed with the clip 1, is capable of deforming within the spacings $W_1$ and $W_2$ according to its opened and closed positions, the clip 1 may be bonded all the more strongly by the thrusting force $P_1$ which absorbs overall or partial variations in spacing W defined by the vehicle body frame B and the window glass G.

When it is desired to remove a molding M for repair or inspection of the glass G, a pin-like remover 17 is inserted between the glass G and the flange portion $f_2$ of the molding M, as shown in FIG. 4(d). A hook 18 at the remover tip is applied at a portion of the hook member 4 and jerked in the direction of arrow a. In this manner, the hook member 4 will be bent in the same direction to thereby allow the pawl 6 to disengage with the flange portion $f_1$, and the molding M will be readily removed.

It should be noted that the above-mentioned hook 18 may be engaged with either the side edge of the hook member 4 or the aperture 19 punched out during the formation of pawl 6. For purposes of illustration, the latter type of engagement is shown.

Referring now to FIG. 5 in particular, there is shown a modification of a clip according to the first embodiment wherein two hook members 4 are provided and two pawl members 9 for engagement with the hooking aperture 12 of the wing plate 10 are formed at about the central portion of the support plate 7. In either engagement, the upper portion of the abutment member 13 may be bent to form a V-shaped configuration so that the wing plate 10 may be spread into opened position through utilization of a component force acting in an inwardly horizontal direction developed at the time of pushing the molding M downwardly.

Attention is now directed to FIGS. 6 through 10 which illustrate the second embodiment of the present invention, basically the same as the first embodiment as the construction is concerned, but employing substantially curved wing plates.

In the drawings, there is shown a clip 21 having a bottom seat 22 at the lower end thereof and a hook member 24 disposed at the central portion thereof. The hook member 24 is formed in a step-like manner from the base portion 24a toward the upper portion thereof and is provided with a flange portion 25 and a pawl 26. The clip 21 also includes a support plate 27 adapted to be bonded to the vehicle body frame B by means of a double-faced adhesive tape 28; and a pair of pawl members 29 foldingly formed through the use of apertures 27a proximate to the U-shaped slits 23.

The clip 21 further includes a pair of wing plates 30 which are bent at a generally U-shaped connection portion 31 formed at the outermost ends of the support plate 27. The formation of the wing plates includes (a) to have a uniform thickness throughout the length, (b) to have a curved portion 30a covering approximately two thirds along the length from the connection portion 31 and expanding inwardly toward the support plate 27, and a straight portion 30b along the length from the portion 30a to the free end of the wing plate 30, and (c) to have a sloping upper edge along the length over portions 30a and 30b, whereby its height is gradually reduced and thus its section modulus is progressively diminished toward the free end of the wing plate 30.

At the upper free end of the straight portion 30b, there is provided a hooking edge 32 engageable with the pawl member 29 and an abutment portion 34 of generally L-shaped configuration vertically formed for cooperative engagement with the end face of the glass G. The abutment portion 34 includes at the upper end thereof a retaining portion 33 for the flange portion $f_1$ of the molding M.

Figure 9A:
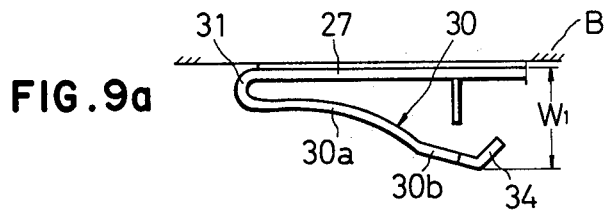
FIGS. 9(a), 9(b) and 9(c) are illustrative views showing respective portions of a wing plate of the clip.
Figure 9B:
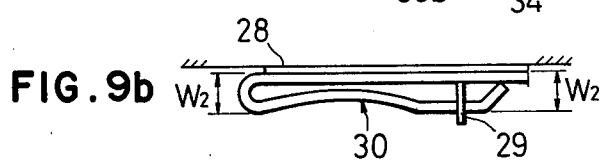
Figure 9C:
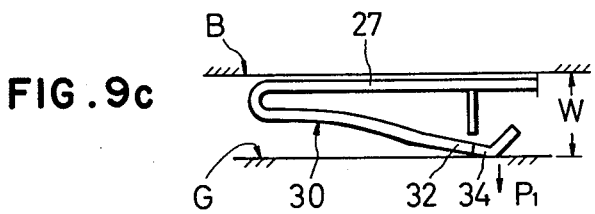

It will be appreciated from FIG. 9 that the wing plate 30 is movable relative to the support plate 27 between an opened position $W_1$ and a closed position $W_2$ through the use of pawl members 29 and hooking edges 32, thereby developing effective thrusting force aided by the elastic deformation within the range. In the closed position, it is to be noted while the connection portion 31, straight portion 30b and abutment portion 34 are disposed within the set spacing $W_2$ relative to the support plate 27, the curved portion 30a is substantially parallel to the support plate 27. However, $W_1$ and $W_2$ are set to be $W_1 > W > W_2$, where W is a spacing between the body frame and the window glass G.

Furthermore, it is important to note that the flange portion 25 of the hook member 24 is disposed suitably at a higher position relative to the abutment portion 34 of each wing plate 30, and the pawl 26, suitably at a lower position relative to the abutment portion 34, as clearly seen in FIG. 8. It should be also appreciated that engagement and disengagement of the pawl member 29 with the hooking edge 32 may be readily achieved by utilizing a vertical elastic deformation of the wing plate 30 through the connection portion 31.

The clip constructed as described in the preceeding paragraphs, may be readily put in practical use, as shown in FIG. 10, in conjunction with the procedures of installing clip 21 to the vehicle body and inserting molding M therebetween.

Figure 10A:
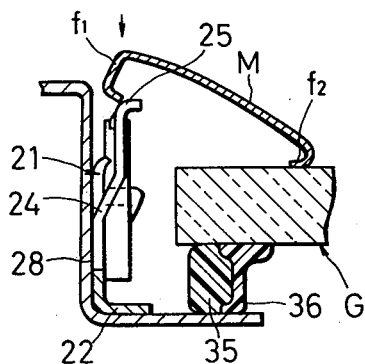
FIGS. 10(a), 10(b), 10(c) and 10(d) are illustrative views showing use of the clip in sequence.
Figure 10B:
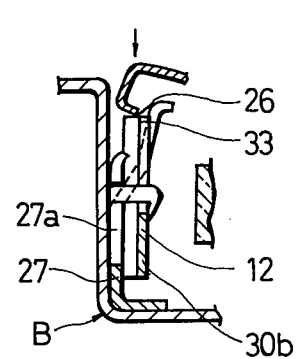

In operation, with the wing plate 30 held in a closed position, the bottom seat 22 of the clip 21 is placed on the body frame B and the support plate 27 of the clip 21 is bonded to a predetermined position of the inner surface of the frame B by using the double-faced adhesive tape 28, as may be seen in FIG. 10(a). Then, flange portions $f_1$ and $f_2$ of the molding M are respectively placed on the hook member 24 and the retaining portions 33 of both wing plates 30 and on the window glass G secured to the frame B. It is then forced in by a finger tip in a direction of arrow, as clearly seen in FIG. 10(a).

During the process, the molding M is locked in place through engagement of the flange portion $f_1$ with pawl 26 aided by inwardly (rightward of FIG. 10) elastic deformation of the hook member 24. As clearly seen in FIG. 10(b), the flange portion $f_1$ of the molding M abuts on both retaining portions 33 of the wing plates 30 and resiliently presses down the free end portion thereof until it is locked to the pawl 26 of the hook member 24. As the result, the pawl members 29 disengage with the hooking edges 32 and the wing plates 30 will be wide spread by its own elasticity. At this moment, the abutment portions 34 abut on the edge face of the glass G, as may be clearly seen in FIG. 10(c).

Figure 10C:
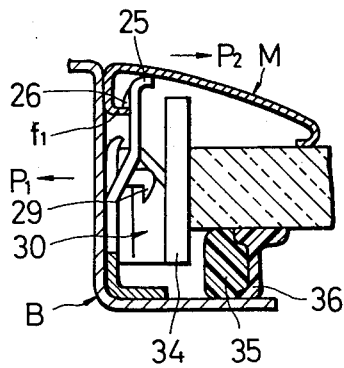

The molding M will be thus held in a proper position, that is, as most clearly seen in FIG. 10(c), under the force due to the deformation of the hook member 24, the outside portion of the flange $f_1$ is pressed to the frame B and the inside portion of the flange $f_2$ contacts tightly with the upper surface of the glass G.

On the other hand, the clip 21 is pushed on the inner surface of the frame B because the thrusting force $P_1$ due to the elastic deformation of both wing plates 30 is greater than stripping force $P_2$ developed at the hook member 24 at the time of insertion of the molding M into the space between the frame B and hook member 24 and tending to strip the clip 21 from the frame B. The clip 21 may be bonded all the more strongly by the thrusting force $P_1$ which absorbs overall or partial variations in spacing W defined by the vehicle body frame B and the window glass G.

Figure 10D:
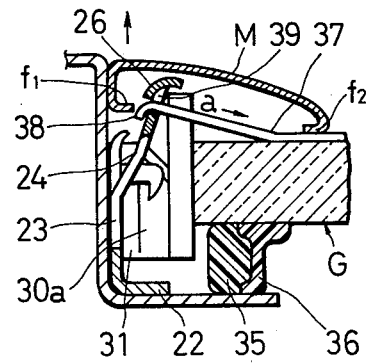

When it is desired to remove a molding M for repair or inspection of the glass G, a pin-like remover 37 is inserted between the glass G and the flange portion $f_2$ of molding M, as shown in FIG. 10(d). A hook 38 at the remover tip is applied at a portion of the hook member 24 (the U-shaped slit 23 or the aperture 39 punched out during the formation of pawl 26) and jerked in the direction of arrow a. In this manner, the hook member 24 will be bent in the same direction to thereby allow the pawl 26 to disengage with the flange portion $f_1$, and the molding M will be readily removed.

Novel technical features of the wing plates 30 according to the second embodiment will now be described in accordance with FIG. 9.

The wing plates 30, as discussed in the preceeding paragraphs are formed generally in a curved configuration along its length. Accordingly, when the wing plates 30 are held at closed position (b) from free position (a), the curved portion 30a is always disposed within an area of which width is substantially equal to the spacing $W_2$, without developing an expanding deformation in the opposite direction away from the support plate 27, that is, the direction toward the window glass G. Thus, when installing a window glass with the clip secured, any possible interference of each wing plate 30 against the glass edge may be prevented, thereby rendering ease of glass installation. Additionally, since the spacing $W_2$ during normal closed position may be reduced to a possible minimum distance, the clip according to the present invention may be suitably employed in a vehicle where the opposed spacing W is small.

Attention is now directed to FIG. 11 which deals with examples to provide for varying section modulus in the wing plate 30. The examples include (a) to form a generally triangular aperture 40 at the central portion of the wing plate 30 so that the height may be substantially altered toward the free end thereof, even with a uniform thickness and a fixed height of the plate 30, as shown in FIG. 11(a), and (b) to have a gradually reduced thickness of the wing plate 30 toward the free end thereof, even with a fixed height of the plate 30, as shown in FIG. 11(b). In either case, possible stress concentration may be prevented.

Additionally, it is to be noted that while a double-faced adhesive tape is used in the preferred embodiment, any suitable bonding agent may be used for bonding of the clip to the vehicle body frame.

What is claimed is:

1. A clip for retaining a molding to a predetermined inside face of a window glass receiving frame in an automotive body comprising
    a band-like support plate formed of an elastic material;
    a flexible hook member formed integrally with said support plate for defining a space for insertion of said molding between said window glass receiving frame and said hook member, said hook member being elastically engageable with said molding;
    a pair of wing plates formed at the outermost ends of said support plate, said wing plates being flexible relative to the center of said support plate;
    means for releasably retaining said wing plates substantially parallel with the center portion of said support plate; and
    means for disengaging said wing retaining means upon insertion of said molding into said space between said window glass receiving means and said hook member;
    said wing clips having at least equal spring force as that of said hook member.

2. An invention as defined in claim 1 wherein said support plate is formed of a metallic material.

3. An invention as defined in claim 1 wherein said support plate is formed of a plastic material.

4. An invention as defined in claim 1 wherein said hook member is disposed between a pair of vertically parallel adjacent slits formed in said support plate and has at generally an upper portion thereof a pawl removably engageable with said molding.

5. An invention as defined in claim 1 wherein said releasably retaining means comprises pawl members formed integrally with said support plate and projecting toward said wing plates and a hooking aperture formed in said wing plates in opposed relationship with said pawl member.

6. An invention as defined in claim 1 wherein said wing plates are provided with an abutment member projecting upwardly thereof and of a dimension to abut on said molding before said hook member securely engages with said molding at the time of installation of said molding.

7. An invention as defined in claim 1 wherein said wing plate is substantially straight.

8. An invention as defined in claim 1 wherein said wing plates are formed to have a progressively reduced height toward the free end thereof and bending convexly relative to said support plate.

9. An invention as defined in claim 1 wherein said wing plates include a punched aperture having a progressively increased height toward the free end of said wing plate and bending convexly relative to said support plate.

10. An invention as defined in claim 1 wherein said wing plates are formed to have a progressively reduced thickness toward the free end thereof.